United States Patent
Takeuchi et al.

(10) Patent No.: US 9,108,352 B2
(45) Date of Patent: Aug. 18, 2015

(54) INJECTION MOLDING MACHINE

(71) Applicant: SUMITOMO HEAVY INDUSTRIES, LTD., Tokyo (JP)

(72) Inventors: Shigeru Takeuchi, Chiba (JP); Masahiro Hayakawa, Chiba (JP); Hiromichi Nosaka, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/160,696

(22) Filed: Jan. 22, 2014

(65) Prior Publication Data

US 2014/0227380 A1 Aug. 14, 2014

(30) Foreign Application Priority Data

Feb. 13, 2013 (JP) ................................. 2013-026039

(51) Int. Cl.
*B29C 45/50* (2006.01)
*B29C 45/83* (2006.01)

(52) U.S. Cl.
CPC ............. *B29C 45/5008* (2013.01); *B29C 45/83* (2013.01); *B29C 2045/5048* (2013.01); *B29C 2045/5056* (2013.01)

(58) Field of Classification Search
CPC B29C 45/76; B29C 45/83; B29C 2045/5048; B29C 2045/5052; B29C 2045/5056; B29C 45/5008
USPC .......................... 425/107, 557, 558, DIG. 115
See application file for complete search history.

(56) References Cited

U.S. PATENT DOCUMENTS

| | | | | |
|---|---|---|---|---|
| 2,567,147 | A * | 9/1951 | Cousino | 425/97 |
| 4,235,575 | A * | 11/1980 | Hehl | 425/107 |
| 4,290,701 | A * | 9/1981 | Schad | 366/77 |
| 4,693,676 | A | 9/1987 | Inaba | |
| 5,217,662 | A * | 6/1993 | Yamamura et al. | 264/40.1 |
| 6,125,969 | A * | 10/2000 | Graf et al. | 184/105.1 |
| 6,468,449 | B1 * | 10/2002 | Fujikawa | 264/40.1 |
| 6,659,753 | B2 * | 12/2003 | Bleier et al. | 425/145 |
| 6,865,963 | B2 * | 3/2005 | Takanohashi et al. | 74/89.44 |
| 7,125,233 | B2 * | 10/2006 | Nishio | 425/145 |

(Continued)

FOREIGN PATENT DOCUMENTS

| | | |
|---|---|---|
| JP | 2000-084987 | 3/2000 |
| JP | 2011-183705 | 9/2011 |

OTHER PUBLICATIONS

Partial European Search Report dated Jun. 3, 2014.

*Primary Examiner* — Yogendra Gupta
*Assistant Examiner* — Emmanuel S Luk
(74) *Attorney, Agent, or Firm* — IPUSA, PLLC

(57) ABSTRACT

An injection molding machine includes a cylinder that feeds a molding material, a screw that is rotatably and advanceably/retractably provided in the cylinder, a plasticizing motor that rotates the screw, a rotation transmission part that is provided in a rear side of the screw in an axial direction of the screw and configured to transmit rotation of the plasticizing motor to the screw. The rotation transmission part includes first and second transmission members provided in a passage where the rotation of the plasticizing motor is transmitted to the screw. The first transmission member is provided toward the plasticizing motor. The second transmission member is provided toward the screw. The first and second transmission members are connected to move relative to each other.

8 Claims, 5 Drawing Sheets

(56) References Cited

U.S. PATENT DOCUMENTS

| | | | |
|---|---|---|---|
| 7,351,049 B1* | 4/2008 | Wang | 425/107 |
| 2002/0119211 A1* | 8/2002 | Bleier et al. | 425/145 |
| 2002/0172733 A1* | 11/2002 | Takanohashi et al. | 425/107 |
| 2005/0255186 A1* | 11/2005 | Hiraga | 425/542 |
| 2006/0188597 A1 | 8/2006 | Chang | |
| 2007/0039458 A1* | 2/2007 | Hoshino et al. | 91/463 |
| 2010/0034913 A1 | 2/2010 | Grunitz et al. | |

\* cited by examiner ately/retractably provided in the cylinder, a plasticizing motor that rotates the screw, a rotation transmission part that is provided in a rear side of the screw in an axial direction
INJECTION MOLDING MACHINE

RELATED APPLICATION

The present application is based on and claims the benefit of Japanese Priority Application No. 2013-026039, filed on Feb. 13, 2013, the entire contents of which are hereby incorporated by reference.

FIELD

The present invention is related to an injection molding machine.

BACKGROUND

An injection molding machine includes a cylinder into which molding material (for example, resin pellets) are fed, a screw that is rotatably and advanceably/retractably provided inside the cylinder, a plasticizing motor that rotates the screw, and an injection motor that advances the screw. The plasticizing motor rotates the screw and forwardly delivers a molding material fed into a spiral-like groove of the screw. The cylinder has multiple band heaters provided to its outer periphery. The heat of the multiple band heaters is transferred to the cylinder and gradually melts the molding material advancing into the cylinder. As the molten molding material is delivered to the front of the screw and accumulates at a front part of the cylinder, the screw is retracted. Then, the injection motor advances the screw, so that the molten material delivered to the front of the screw is ejected from a nozzle provided at the front part of the cylinder and fills a cavity space inside a mold unit.

SUMMARY

An injection molding machine includes a cylinder that feeds a molding material, a screw that is rotatably and advanceably/retractably provided in the cylinder, a plasticizing motor that rotates the screw, a rotation transmission part that is provided in a rear side of the screw in an axial direction of the screw and configured to transmit rotation of the plasticizing motor to the screw. The rotation transmission part includes first and second transmission members provided in a passage where the rotation of the plasticizing motor is transmitted to the screw. The first transmission member is provided toward the plasticizing motor. The second transmission member is provided toward the screw. The first and second transmission members are connected to move relative to each other.

DESCRIPTION OF EMBODIMENTS

Figure 1:
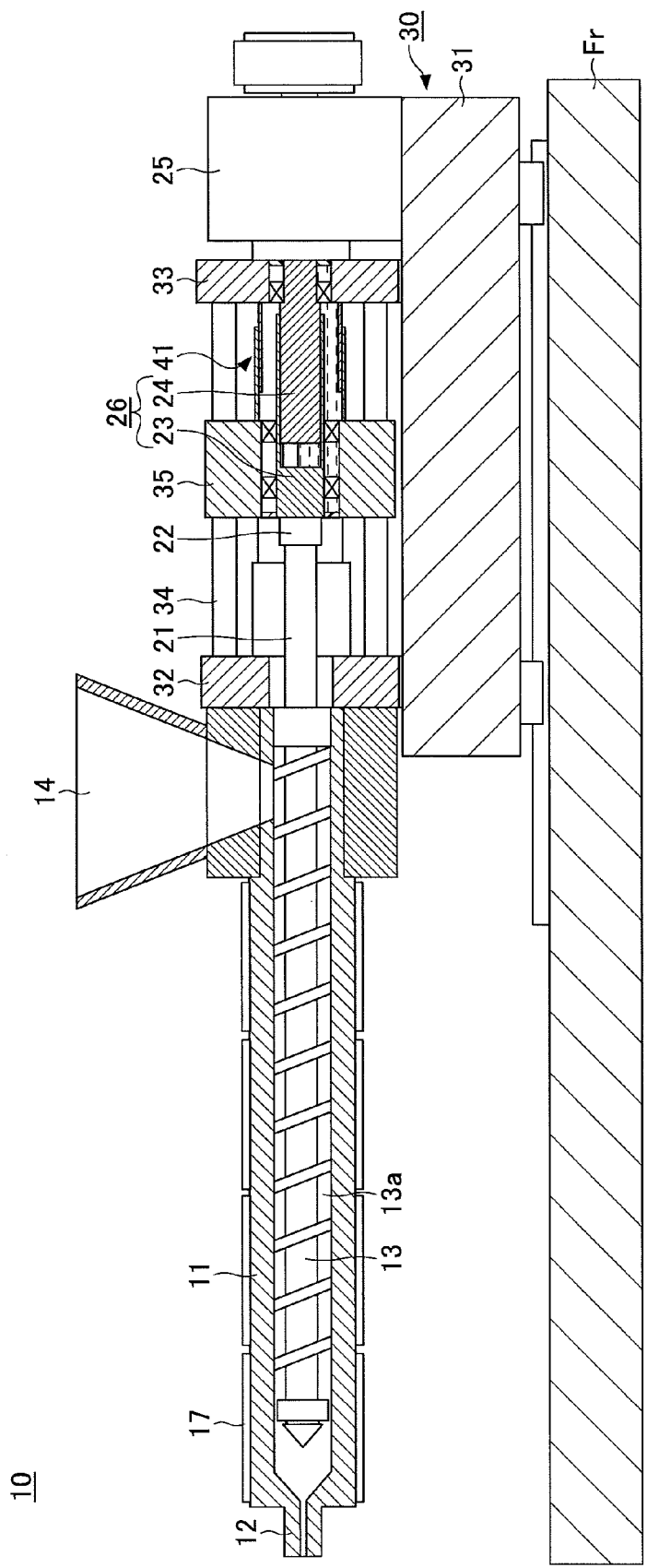
FIG. 1 is a cross-sectional view illustrating a portion of an injection molding machine according to an embodiment of the present invention.

In a case where a screw is advanced by an injection motor, the injection motor had to advance a plasticizing motor together with the screw. This was a waste of energy for the injection motor.

An embodiment of the present invention provides an injection molding machine that reduces energy consumption of an injection motor that advances a screw.

In the following, embodiments of the present invention will be described in detail by referring to the accompanying drawings. In the drawings, similar or corresponding configurations are denoted with similar or corresponding reference numerals and are not further explained. Further, a direction in which a screw moves when a molding material is ejected from a cylinder is described as a "front side", and a direction in which a screw moves when a molding material is accumulated at a front part of a cylinder is described as a "rear side".

Figure 2:
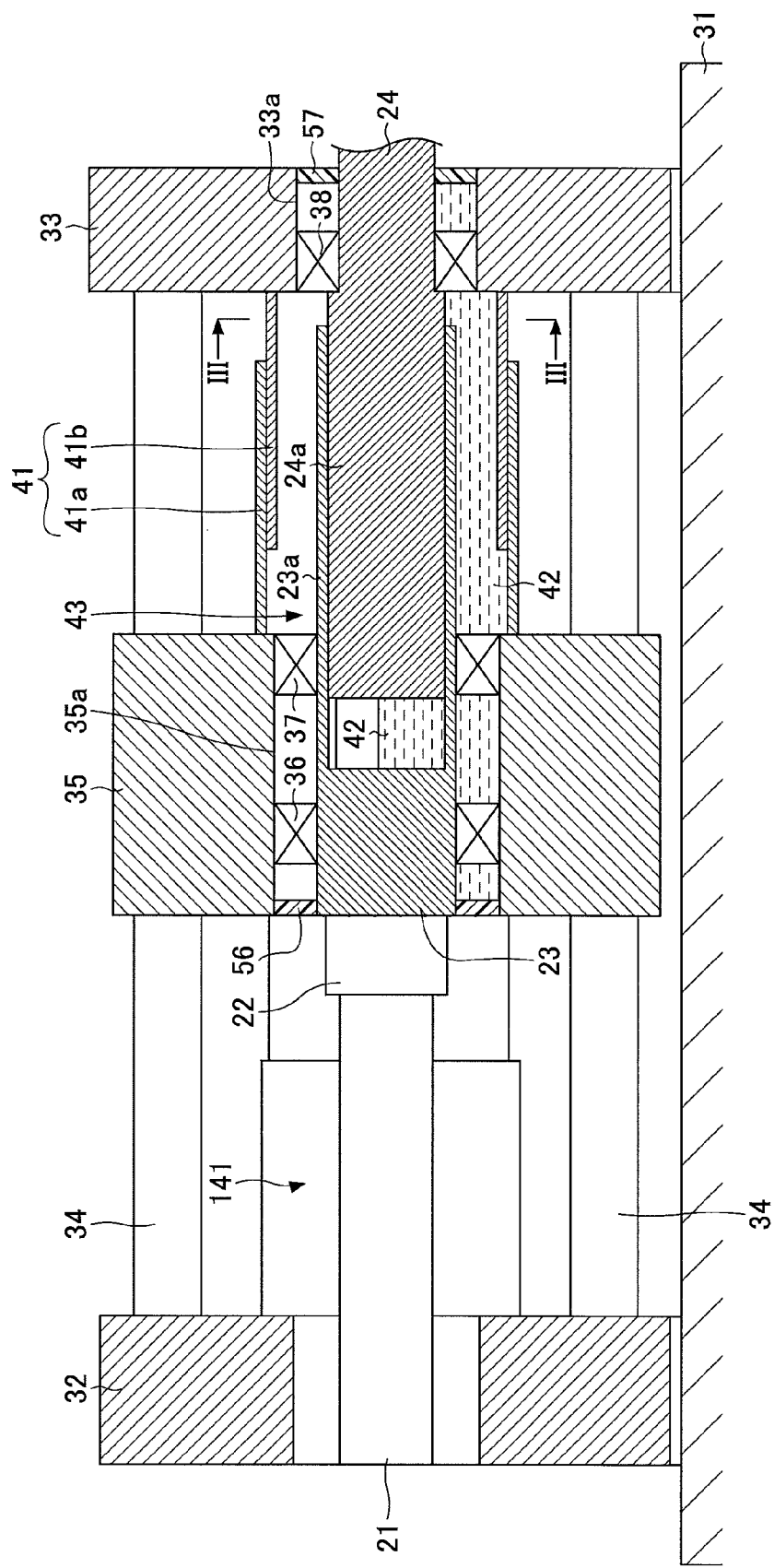
FIG. 2 is an enlarged view of a portion of FIG. 1.
Figure 3:
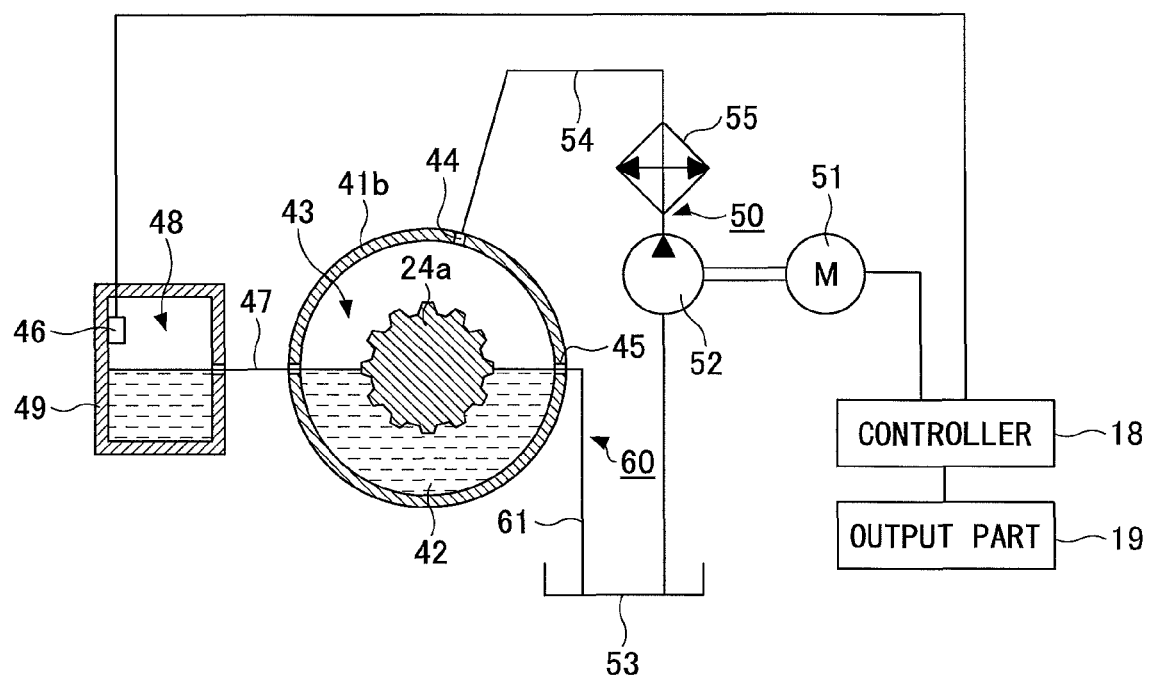
FIG. 3, which is a cross-sectional view taken along line of FIG. 2, illustrates apparatuses in a periphery of a reservoir space for storing lubricating oil in a periphery of a spline coupling mechanism.
Figure 4:
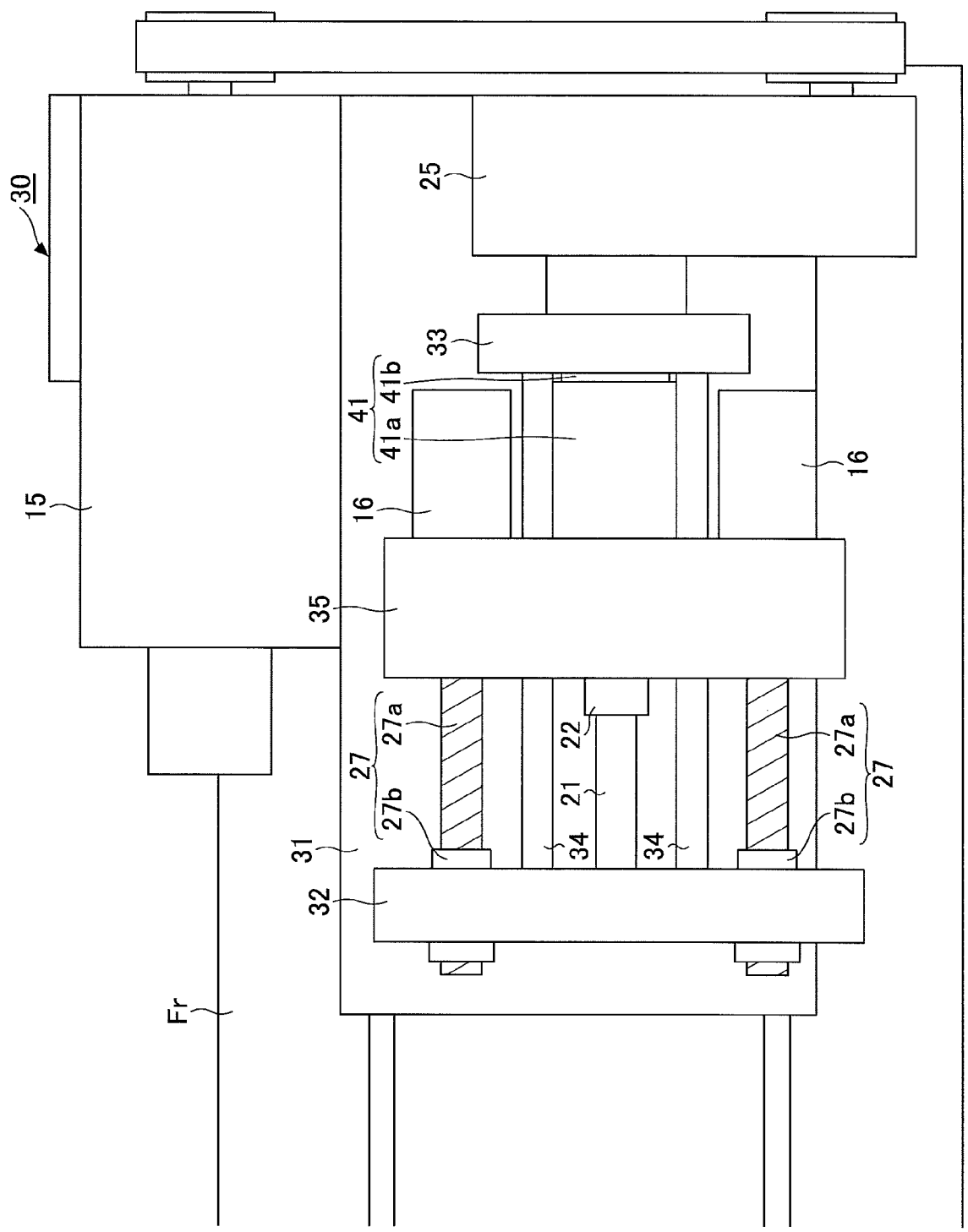
FIG. 4 is a top plan view of FIG. 2.
Figure 5:
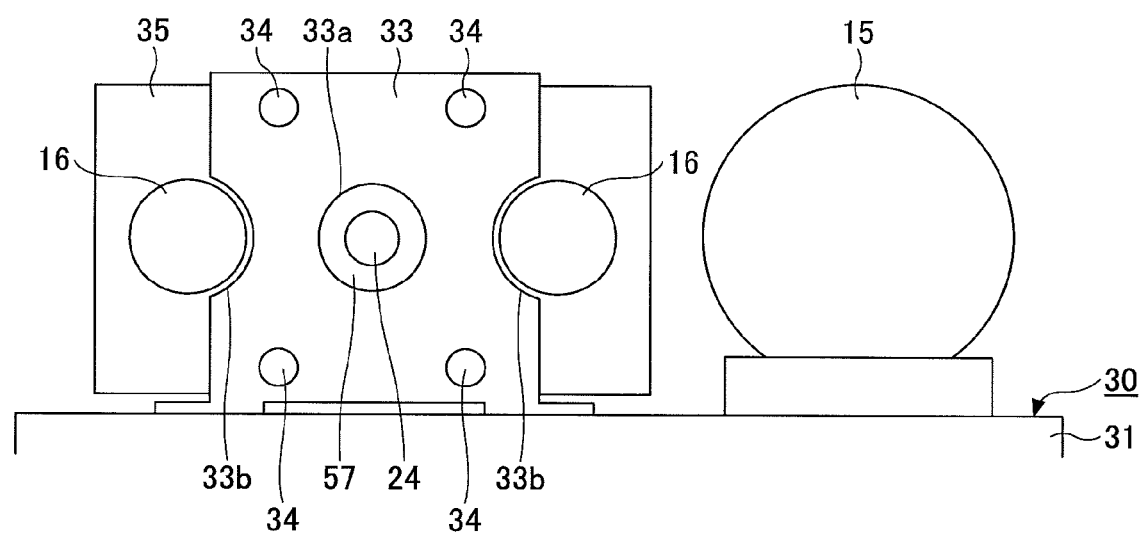
FIG. 5 is a rear view of a rear side support of FIG. 2.

FIG. 1 is a cross-sectional view illustrating a portion of an injection molding machine according to an embodiment of the present invention. FIG. 2 is an enlarged view of a portion of FIG. 1. FIG. 3, which is a cross-sectional view taken along line of FIG. 2, illustrates apparatuses in a periphery of a reservoir space for storing lubricating oil in a periphery of a spline coupling mechanism. FIG. 4 is a top plan view of FIG. 2. FIG. 5 is a rear view of a rear side support of FIG. 2.

As illustrated in FIG. 1 and FIG. 4, an injection molding machine 10 includes, for example, a cylinder 11, a screw 13 provided in the cylinder 11, a plasticizing motor 15 that rotates the screw 13, and an injection motor 16 that advances the screw 13.

A hopper 14 is provided at a rear part of the cylinder 11 as a material supply part for supplying a molding material (for example, resin pellets) into the cylinder 11. Although the material supply part of the present embodiment is configured to include the hopper 14, the material supply part may be configured to include, for example, a feed screw that can adjust a supply amount.

The screw 13 is rotatably and advanceably/retractably provided inside the cylinder 11. A spiral-like groove 13a is formed in the screw 13. A molding material is fed into the groove 13 from the hopper 14. When the screw 13 rotates, the molding material is delivered to the front side along the spiral-like groove 13a. The groove 13a may have a constant depth. Alternatively, the groove 13a may have different depths in different areas thereof.

A shaft part 21 extending to the rear side from the screw 13 is coupled to a drive shaft 23 via a coupling 22. The drive shaft 23 rotates together with the screw 13 and advances/retracts together with the screw. A rotation shaft 24 is coupled to the drive shaft 23. The screw 13, the shaft part 21, the drive shaft 23, and the rotation shaft 24 are coaxially provided in this order. Further, the drive shaft 23 and the rotation shaft 24 may constitute a rotation transmission part 26 (see FIG. 1).

The rotation transmission part 26, which is provided at a rear side of the screw 13 in an axial direction of the screw 13, transmits the rotation of the plasticizing motor 15 to the screw 13. The rotation transmission part 26 includes the rotation shaft 24 serving as a first transmission member and the drive shaft 23 serving as a second transmission member. In a passage where the rotation of the plasticizing motor 15 is transmitted to the screw 13, the rotation shaft 24 is provided toward the plasticizing motor 15, and the drive shaft 23 is provided toward the screw 13. The rotation shaft 24 and the drive shaft 23 are connected to move relative to each other.

The rotation shaft 24 rotates together with the drive shaft 23. The rotation shaft 24 permits the advancing/retracting of the drive shaft 23. For example, as illustrated in FIG. 2, a spline nut part 23a formed in the drive shaft 23 and a spline shaft part 24a formed in the rotation shaft 24 mesh with each other. For example, as illustrated in FIG. 3, the spline shaft part 24a is constituted by a rod-like part and multiple protruding parts provided in an outer periphery of the rod-like part. The spline nut part 23a is constituted by, for example, a tube-like part and multiple recess parts provided in an inner periphery of the tube-like part. Thus, the recess parts of the spline nut part 23a and the protruding parts of the spline shaft part 24a mesh with each other. The spline nut part 23a and the spline shaft part 24a constitute a spline coupling mechanism.

It is to be noted that the drive shaft 23 and the rotation shaft 24 may have a wide variety of configurations. For example, the positions of the spline shaft part 24a and the spline nut part 23a may be reversed. A spline shaft part may be formed in the drive shaft 23, and a spline nut part may be formed in the rotation shaft 24. Further, one or more protruding parts may be provided in an outer periphery of a rod-like part of the spline shaft part. Alternatively, one or more recess parts may be provided in the outer periphery of the rod-like part of the spline shaft part. In a case where one or more recess parts are provided in the outer periphery of the rod-like part of the spline shaft part, protruding parts are provided in an inner periphery of a tube-like part of the spline nut part. Further, a pin may be fixed to one of the drive shaft 23 and the rotation shaft 24, and a recess part engageable to the pin may be formed in the other of the drive shaft 23 and the rotation shaft 24. The pin, which is fixed to the one of the drive shaft 23 and the rotation shaft 24, is advanceably/retractably inserted to the recess part formed in the other of the drive shaft 23 and the rotation shaft 24.

The plasticizing motor 15 (see FIG. 4) rotates the screw 13 inside the cylinder 11. The rotation of the plasticizing motor 15 is transmitted to a speed reducer 25 via a belt or a pulley. The rotation shaft 24 is rotated by a torque corresponding to a speed reduction ratio of the speed reducer 25. The screw 13 is rotated together with the rotation axis 24. It is to be noted that a belt or a pulley need not be provided in the speed reducer 25. Alternatively, an output shaft of the plasticizing motor 15 may be coaxially coupled to the rotation shaft 24.

As illustrated in FIG. 5, the plasticizing motor 15 is fixed to a base 31. As illustrated in FIGS. 1 and 2, a front side support 32 and a rear side support 33 are fixed to the base 31. Because the base 31 causes the nozzle 12 of the cylinder 11 to contact/separate with respect to the mold unit, the base 31 can advance/retract with respect to a frame Fr of the injection molding machine 10. A rear end part of the cylinder 11 is attached to the front side support 32. Multiple guide bars (for example, 4 guide bars) 34 are coupled to the front side support 32 and the rear side support 33. The guide bars 34 guide the advancing/retracting of a pressure plate 35 provided between the front side support 32 and the rear side support 33. Insertion holes are formed in the pressure plate 35 for inserting the guide bars 34 therethrough. The base 31, the front side support 32, the rear side support 33, and the guide bars 34 constitute an injection frame 30. As long as the plasticizing motor 15 is fixed to the injection frame 30, the plasticizing motor 15 may be fixed to any one of the base 31, the front side support 32, the rear side support 33, and the guide bars 34.

It is to be noted that, although the injection frame 30 is constituted by the base 31, the front side support 32, the rear side support 33, and the guide bars 34, the injection frame 30 is not limited to such configuration. For example, guide rails may be provided on the base 31 instead of the guide bars 34, so that the guide rails can guide the advancing/retracting of the pressure plate 35.

The pressure plate 35 is a movable member that can advance/retract with respect to the base 31. As illustrated in FIG. 2, the pressure plate 35 retains shaft bearings 36, 37 that rotatably support the drive shaft 23. The pressure plate 35 advance/retracts together with the drive shaft 23 with respect to the base 31.

The injection motor 16 (see FIG. 4) moves the screw 13 inside the cylinder 11. The injection motor 16 advances/retracts the drive shaft 23, for example, by advancing/retracting the pressure plate 35 with respect to the base 31. The rotating movement of the injection motor 16 is converted to a straight-linear movement of the drive shaft by a ball screw mechanism 27. Thereby, the screw 13 is advanced/retracted together with the drive shaft 23. Neither the rotation shaft 24 (which is coupled to the drive shaft 23) nor the plasticizing motor 15 (which rotates the rotation shaft 24) advances/retracts when the screw 13 advances/retracts together with the drive shaft 23.

The ball screw mechanism 27 is constituted by a ball screw shaft 27a and a ball screw nut 27b that is fastened to the ball screw shaft 27a. Although the ball screw shaft 24a is coaxially coupled to an output shaft of the injection motor 16, the ball screw shaft 24a may be coupled to the output shaft of the injection motor 16 by way of, for example, a belt or a pulley. The injection motor 16 is fixed to the pressure plate 35. The ball screw nut 27b is fixed to the front side support 32.

When the injection motor 16 is driven, the pressure plate 35 may be advanced/retracted by advancing/retracting the ball screw shaft 27a while rotating the ball screw shaft 27a. It is, however, to be noted that the movement of the ball screw mechanism 27 during the driving of the injection motor 16 is not limited to the movement described above. For example, when the injection motor 16 is driven, the pressure plate 35 may be advanced/retracted by rotating the ball screw shaft 27a and advancing/retracting the ball screw nut 27b. In this case, for example, the ball screw nut 27b is fixed to the pressure plate 35 whereas the injection motor 16 is fixed to the front side support 32 or the rear side support 33. Further, when the injection motor 16 is driven, the pressure plate 35 may be advanced/retracted by rotating the ball screw nut 27b and advancing/retracting the ball screw shaft 27a. In this case, for example, a shaft bearing, which rotatably supports a shaft part extending from the ball screw shaft 27a, is fixed to the pressure plate 35 whereas a shaft bearing, which rotatably supports the ball screw nut 27b, is fixed to the front side support 32 or the rear side support 33.

As illustrated in FIG. 4, multiple injection motors 16 may be provided. Further, multiple ball screw mechanisms 27 that convert the rotation of the injection motor 16 to the advancing/retracting movement of the pressure plate 35 may be provided. The multiple ball screw mechanisms 27 are symmetrically arranged in which a center of the ball screw mechanisms 27 is a center line of the screw 13. Thereby, forces that press the pressure plate 35 toward the front side are symmetrically generated around the center line of the screw 13. Thus, the screw 13 can be prevented from deforming (e.g., bending).

Next, an operation of the injection molding machine 10 is described. The injection molding machine 10 performs a mold closing process for closing a mold unit (not illustrated), a mold clamping process for clamping the mold unit, a filling process for allowing a molten molding material to flow into the mold unit in a clamped state, a hold pressure process for applying pressure to the molding material flowed into the mold unit, a cooling process for solidifying the molding material inside the mold unit after the hold pressure process, a plasticizing process for plasticizing a molding material for the next molding product, a mold opening process for opening the mold unit, and an ejecting process for ejecting a molding product from the mold unit after the mold opening process. By repeating these processes, the injection molding machine 10 can repetitively manufacture molding products.

The plasticizing process may be performed during the cooling process, so that a molding cycle can be shortened.

In the plasticizing process, the plasticizing motor 15 is driven to rotate the screw 13 and forwardly deliver a molding material fed into the spiral-like groove 13a of the screw 13. Multiple band heaters 17 are provided in the outer periphery of the cylinder 11. The heat of the multiple band heaters 17 that is transferred to the cylinder 11 gradually melts the molding material advancing into the cylinder 11. The molten molding material is delivered to the front side of the screw 13. As the molten molding material accumulates at the front part of the cylinder 11, the screw 13 is retracted.

In the plasticizing process, the injection motor 16 may be driven to apply a predetermined back pressure to the screw 13 for constraining abrupt retracting of the screw 13. When the screw 13 retracts to a predetermined position and a predetermined amount of molding material accumulates at the front side of the screw 13, the driving of the plasticizing motor 15 and the injection motor 16 is stopped.

In the filling process, the molding material accumulated at the front side of the screw 13 is ejected from the nozzle 12 provided at the front part of the cylinder 11 by advancing the screw 13 at a setting speed by driving the injection motor 16. Thereby, the molding material fills a cavity space inside the mold unit that contacts the nozzle 12. When the screw 13 advances to a predetermined position (so-called "V/P switch position"), the hold pressure process is started. The hold pressure process may be started when the time that has elapsed from the start of the filling process reaches a predetermined time. The setting speed of the screw 13 may be a constant speed or a speed that may be changed in correspondence with the position of the screw 13 or the elapsed time.

In the hold pressure process, the injection motor 16 is driven to thrust the screw 13 with the setting pressure. Accordingly, a molding material equivalent to a shrinkage volume caused by the cooling of the molding material is provided inside a cavity space. The cooling process is started after an entrance (so-called "gate") of the cavity space is sealed by a solidified molding material for preventing the back flow of the molding material from the cavity space. The plasticizing process for plasticizing the molding material of the next molding product may be performed during the cooling process. The setting pressure of the screw 13 may be a constant pressure or a pressure that may be changed in correspondence with the elapsed time.

As illustrated in FIG. 1, the rotation transmission part 26, which is provided at a rear side of the screw 13 in its axial direction, transmits the rotation of the plasticizing motor 15 to the screw 13. The rotation transmission part 26 includes the drive shaft 23 and the rotation shaft 24 that are connected to move relative to each other. Therefore, when the drive shaft 23 is moved by driving the injection motor 16, neither the rotation shaft 24 connected to the drive shaft 23 nor the plasticizing motor 15 rotating the rotation shaft 24 need to be moved. Accordingly, compared to the related art where the injection motor moves the plasticizing motor, the energy consumption of the injection motor 16 can be reduced. Further, size reduction of the injection motor 16 can be achieved.

Further, as illustrated in FIGS. 1 and 2, the injection motor 16 is fixed to the pressure plate (movable member) 35. The injection motor 16 advances/retracts together with the pressure plate 35 relative to the base 31. When the pressure plate 35 is retracted (for example, during the plasticizing process), the injection motor 16 may be inserted into a recess part 33b (see FIG. 5) formed in the rear side support 33. In a case where the moving distance of the injection motor 16 is constant, the interval between the front side support 32 and the rear side support 33 can be shortened. Thus, the entire length of the injection molding machine 10 can be shortened.

As illustrated in FIGS. 1 and 2, the guide bars 34 are fixed to the rear side support (fixing member) 33 and guide the advancing/retracting of the pressure plate 35. As illustrated in FIG. 5, the positions of the guide bars 34 are shifted from the insertion hole 33a of the rear side support 33 (throughwhich the rotation shaft 24) in a direction (vertical direction in FIG. 5) orthogonal to a direction connecting the insertion hole 33a and the recess part 33b (horizontal direction in FIG. 5). Thus, the guide bars 34 can be provided to avoid the recess part 33b and positioned away from the rotation shaft 24. Thereby, the position of the pressure plate 35 that is guided forwardly/backwardly by the guide bars 34 becomes stable. Multiple guide bars (for example, 4 guide bars) 34 may be symmetrically arranged in a vertical direction or a horizontal direction in which a center of the guide bars 34 is a center line of the rotation shaft 24.

It is to be noted that, as long as the positions of the guide bars 34 are shifted from the insertion hole 33a in a direction (vertical direction in FIG. 5) orthogonal to the direction connecting the insertion hole 33a and the recess part 33b, the positions of the guide bars 34 may also be shifted from the insertion hole 33a in the direction connecting the insertion hole 33a and the recess part 33b.

As illustrated in FIGS. 2 and 3, the injection molding machine 10 includes an expandable/retractable member 41 that forms a reservoir space 43 for storing lubricating oil 42 in the peripheries of the rotation shaft 24 and the drive shaft 23. The expandable/retractable member 41, which is provided between the rear side support 33 and the pressure plate 35, expands and retracts in correspondence with the space formed between the rear side support 33 and the pressure plate 35. One end part of the expandable/retractable member 41 is attached to the rear side support 33 whereas another end part of the expandable/retractable member 41 is attached to the pressure plate 35. The position of the pressure plate 35 with respect to the rear side support 33 and the position of the pressure plate 35 with respect to the drive shaft 33 are displaced cooperatively with each other.

In order to prevent scattering of the lubricating oil 42, the expandable/retractable member 41 may be formed in a cylindrical shape that encompasses a peripheries of the drive shaft 23 and the rotation shaft 24. For example, the expandable/retractable member 41 may be a telescopic type. The expandable/retractable member 41 may include a moving side cylinder part 41a attached to the pressure plate 35 and a fixed side cylinder part 41b attached to the rear side support 33.

The expandable/retractable member 41 forms the reservoir space 43 between the pressure plate 35 and the rear side support 33 for storing the lubricating oil 42 in the peripheries of the drive shaft 23 and the rotation shaft 24. The lubricating oil 42 is fed between the drive shaft 23 and the rotation shaft 24 for providing lubrication between the drive shaft 23 and the rotation shaft 24. The lubricating oil 42 contacts at least a part of the drive shaft 23 or the rotation shaft 24. The lubricating oil 42 can be retained between the drive shaft 23 and the rotation shaft 24 owing to the reservoir space 43 capable of retaining the lubricating oil 42 therein.

The lubricating oil 42 in the reservoir space 43 may be fed to a sliding portion of the shaft bearings 36, 37 that rotatably support the drive shaft 23 and a sliding portion of a shaft bearing that rotatably supports the rotation shaft 24. For example, in a case of a roller bearing where a space between an inner ring and an outer ring of the roller bearing communicates with the reservoir space 43, the lubricating oil 42 is fed to a rolling member (e.g., a ball or a roller) provided between the inner and outer rings.

The drive shaft 23 is inserted into the insertion hole 35a formed in the pressure plate 35, and a space formed between a wall of the insertion hole 35a and the drive shaft 23 is sealed by a sealing member 53. The sealing member 53, which is provided at the front side of the shaft bearings 36, 37 in the drive shaft 23, prevents the lubricating oil 42 of the shaft bearings 36, 37 from flowing in a direction opposite from the reservoir space 43.

Similarly, the rotation shaft 24 is inserted into the insertion hole 33a formed in the rear side support 33, and a space formed between a wall of the insertion hole 33a and the rotation shaft 24 is sealed by a sealing member 54. The sealing member 54, which is provided at the rear side of the shaft bearing 38 of the rotation shaft 24 in the insertion hole 33a, prevents the lubricating oil 42 of the shaft bearing 38 from flowing in a direction opposite from the reservoir space 43.

As illustrated in FIG. 3, a feeding part 50 feeds the lubricating oil 42 to the reservoir space 43. The feeding part 50 includes, for example, a feeding motor 51, a feeding pump 52, a feeding tank 53, and a feeding tube 54. The feeding motor 51 drives the feeding pump 52, so that the lubricating oil 42 stored in the feeding tank 53 is delivered to the feeding tube 54 and fed to the reservoir space 43. It is to be noted that the configuration of the feeding part 50 is not limited to the configuration described above. For example, the feeding tube 54 may be omitted from the feeding part 50, so that the feeding pump 52 is directly connected to an inlet 44 of the reservoir space 43.

In a case where the inlet 44 of the reservoir space 43 is formed in the expandable/retractable member 41, the inlet 44 may be formed in the fixing side cylinder part 41b rather than the moving side cylinder part 41a. In a case where the feeding pump 52 is fixed to the injection frame 30, a positional relationship between the feeding pump 52 and the inlet 44 of the reservoir space 43 does not change during the advancing/retracting of the pressure plate 35. Therefore, the feeding pump 52 and the inlet 44 of the reservoir space 43 can be easily connected to each other. It is to be noted that the inlet 44 of the reservoir space 43 may be formed in the rear side support 33 to which the fixing side cylindrical part 41b is attached.

A discharge part 60 discharges the lubricating oil 42 outside from the reservoir space 43. The discharge part 60 may include, for example, a discharge tube 61. The discharge tube 61 allows excess lubricating oil 42 in the reservoir space 43 to be discharged naturally by gravity and return to the feeding tank 53. In a case where the volume of the reservoir space 43 changes in correspondence with the expanding/retracting of the expandable/retractable member 41, excess lubricating oil 42 is discharged naturally by gravity. Thereby, the amount of the lubricating oil 42 in the reservoir space 43 can be automatically adjusted. Because the amount of the lubricating oil 42 is automatically adjusted, the feeding part 50 may consecutively feed the lubricating oil 42 to the reservoir space 43 at a predetermined flow rate.

It is to be noted that the configuration of the discharge part 60 is not limited to the configuration described above. For example, the discharge part 60 may include a discharge pump that sucks the lubricating oil 42 into the reservoir space 43 and a discharge motor that drives the discharge pump. In a case where the amount of the lubricating oil 42 inside the reservoir space 43 exceeds an upper limit, the lubricating oil 42 can be forcibly discharged from the reservoir space 43. Further, the discharge part 60 may include a collecting tank for collecting the lubricating oil 42 discharged from the reservoir space 43.

The lubricating oil 42 inside the reservoir space 43 is agitated and warmed by the movements of the drive shaft 23 and the rotation shaft 24. By discharging the lubricating oil 42 from the reservoir space 43 to the outside, heat can be carried to the outside by the discharged lubricating oil 42. Thereby, the temperature inside the reservoir space 43 can be prevented from increasing.

In a case where the lubricating oil 42 discharged from the reservoir space 43 is returned to the feeding tank 53, a cooler 55 may be provided for cooling the lubricating oil 42. For example, the cooler 55 may be provided in the feeding tube 54, so that the lubricating oil 42 can be cooled by the thermal exchange performed between the cooler 55 and the feeding tube 54. It is to be noted that the cooler 55 may be provided anywhere in a circulation path of the lubricating oil 42.

An outlet of the reservoir space 43 is provided higher than a lower end of the drive shaft 23 and a lower end of the rotation shaft 24, so that at least a part of the drive shaft 23 and a part of the rotation shaft 24 is immersed in the lubricating oil 42. In a case where the outlet 45 of the reservoir space 43 is formed in the expandable/retractable member 41, the outlet 45 may be formed in the fixing side cylinder part 41b rather than the moving side cylinder part 41a. In a case where the feeding tank 53 is fixed to the injection frame 30, a positional relationship between the feeding tank 53 and the outlet 45 of the reservoir space 43 does not change during the advancing/retracting of the pressure plate 35. Therefore, the feeding tank 53 and the outlet 45 of the reservoir space 43 can be easily connected to each other. It is to be noted that, instead of forming the outlet 45 of the reservoir space 43 in the fixing side cylinder part 41b, the outlet 45 may be formed in the rear side support 33 to which the fixing side cylindrical part 41b is attached.

A detection part 46 detects the amount of the lubricating oil 42 in the reservoir space 43. Thereby, the amount of the lubricating oil 42 in the reservoir space 43 can be managed. The detection part 46 includes, for example, a liquid level sensor. The liquid level sensor may be a non-contact type level sensor or a contact type level sensor. As an example of the non-contact type level sensor, there is a liquid level sensor that transmits an ultrasonic wave to a liquid surface of the lubricating oil 42 and measures the time between transmitting the ultrasonic wave and receiving a reflected wave responsive to the transmitted ultrasonic wave. Alternatively, an electromagnetic wave such as light may be used instead of the ultrasonic wave. As an example of a contact type liquid level sensor, there is a level sensor that detects a position of a float that elevates in correspondence with the changes of a liquid surface of the lubricating oil 42.

The detection part 46 may detect the liquid level of lubricating oil 42 of the reservoir space 43 by detecting the liquid level of the lubricating oil 42 in a detection space 48 communicating with the reservoir space 43 via a flow path 47. The detection space 48 is formed inside a detection container 49. The volume of the detection space 48 is constant. In a case where the volume of the reservoir space 43 changes along with the expanding/retracting of the expandable/retractable member 41, the liquid level of the lubricating oil 42 in the reservoir space 43 changes, and the lubricating oil 42 flows through the flow path 47. In this case, the change of the liquid level of the lubricating oil 42 in the detection space 48 is constrained by a flow resistance generated by the flow of the lubricating oil 42. Thereby, detection results of the liquid level of the lubricating oil 42 can be leveled.

The detection part 46 outputs the detection results to a controller 18. The controller 18 includes, for example, a CPU (Central Processing Unit) and a memory. The controller 18 implements various functions by using the CPU to execute a program(s) stored in, for example, the memory.

The controller 18 activates an output part 19 that outputs an alarm based on the detection results of the detection part 46. For example, in a case where the amount of the lubricating oil 42 in the reservoir space 43 exceeds a predetermined range (e.g., becomes higher than an upper limit value or becomes lower than a lower limit value), the controller 18 activates the output part 19. The alarm output from the output part 19 may take the form of, for example, an image, a letter, or a sound.

Further, the controller 18 may control the amount of the lubricating oil 42 in the reservoir space 43 based on the detection results of the detection part 46. For example, in a case where the amount of the lubricating oil 42 in the reservoir space 43 is lower than a lower limit value, the controller 18 drives the feeding motor 51 to increase the amount of the lubricating oil 42 in the reservoir space 43. Further, in a case where the amount of the lubricating oil 42 in the reservoir space 43 is greater than an upper limit value, the controller 18 drives a discharge motor (not illustrated) to reduce the amount of the lubricating oil 42 in the reservoir space 43.

According to the above-described embodiment, there is provided an injection molding machine that can reduce the energy consumption of an injection motor that advances/retracts a screw.

The present invention is disclosed with reference to the preferred embodiments. However, it should be understood that the present invention is not limited to the above-described embodiments, and variations and modifications may be made without departing from the scope of the present invention.

For example, although the injection molding machine 10 of the above-described embodiment is an in-line screw type injection molding machine, the injection molding machine 10 may be a screw preplasticating type injection molding machine. With the screw preplasticating type injection molding machine, a molding material, which is melted in a plasticizing cylinder, is fed to an injection cylinder and injected from the injection cylinder to a mold unit. Because the plasticizing cylinder and the injection cylinder are provided separately, a screw provided in the plasticizing cylinder can be driven to rotate during a filling process or a hold pressure process.

Further, although the expandable/retractable member 41, 141 of the above-described embodiment is a telescopic type, other types such as a bellows type may be used as the expandable/retractable member 41, 141 as long as the type is expandable and retractable.

Although a lubricating oil is used as a lubricating agent in the above-described embodiment, grease may be used as the lubricating agent.

What is claimed is:

1. An injection molding machine, comprising:
a cylinder that feeds a molding material;
a screw that is rotatably and advanceably/retractably provided in the cylinder;
a plasticizing motor that rotates the screw;
a rotation transmission part that is provided in a rear side of the screw in an axial direction of the screw and configured to transmit rotation of the plasticizing motor to the screw, wherein the rotation transmission part includes first and second transmission members provided in a passage where the rotation of the plasticizing motor is transmitted to the screw, the first transmission member being provided toward the plasticizing motor, and the second transmission member being provided toward the screw, wherein the first and second transmission members are connected to move relative to each other;
a base;
a movable member that advances/retracts together with the second transmission member with respect to the base;
a fixing member fixed to the base and including an insertion hole throughwhich the first transmission member is inserted; and
an injection motor that moves the movable member with respect to the base and moves the screw inside the cylinder,
wherein the injection motor is fixed to the movable member,
wherein the injection motor is configured to advance/retract together with the movable member, and
wherein the injection motor is inserted into a recess part formed in the fixing member when the movable member is retracted.

2. The injection molding machine as claimed in claim 1, further comprising:
a guide bar fixed to the fixing member and configured to guide advancing/retracting of the movable member;
wherein a position of the guide bar is shifted from the insertion hole in a direction orthogonal to a direction connecting the insertion hole and the recess part.

3. The injection molding machine as claimed in claim 1, further comprising:
an expandable/retractable member that is provided between the movable member and the fixing member and configured to expand/retract in correspondence with an interval between the movable member and the fixing member;
wherein the expandable/retractable member is configured to form a reservoir space that stores a lubricating agent in a periphery of the first transmission member and a periphery of the second transmission member.

4. The injection molding machine as claimed in claim 3, further comprising:
a feeding part configured to feed the lubricating agent to the reservoir space.

5. The injection molding machine as claimed in claim 3, further comprising:
a discharge part configured to discharge the lubricating agent outside from the reservoir space.

6. The injection molding machine as claimed in claim 3, further comprising:
a detection part configured to detect an amount of the lubricating agent in the reservoir space.

7. The injection molding machine as claimed in claim 6, further comprising:
an output part configured to output an alarm based on a detection result of the detection part.

8. The injection molding machine as claimed in claim 6, further comprising:
a controller configured to control an amount of the lubricating agent in the reservoir space based on a detection result of the detection part.

* * * * *